H. BARSALOW.
Corn-Planter.
No. 61,041. Patented Jan. 8, 1867.
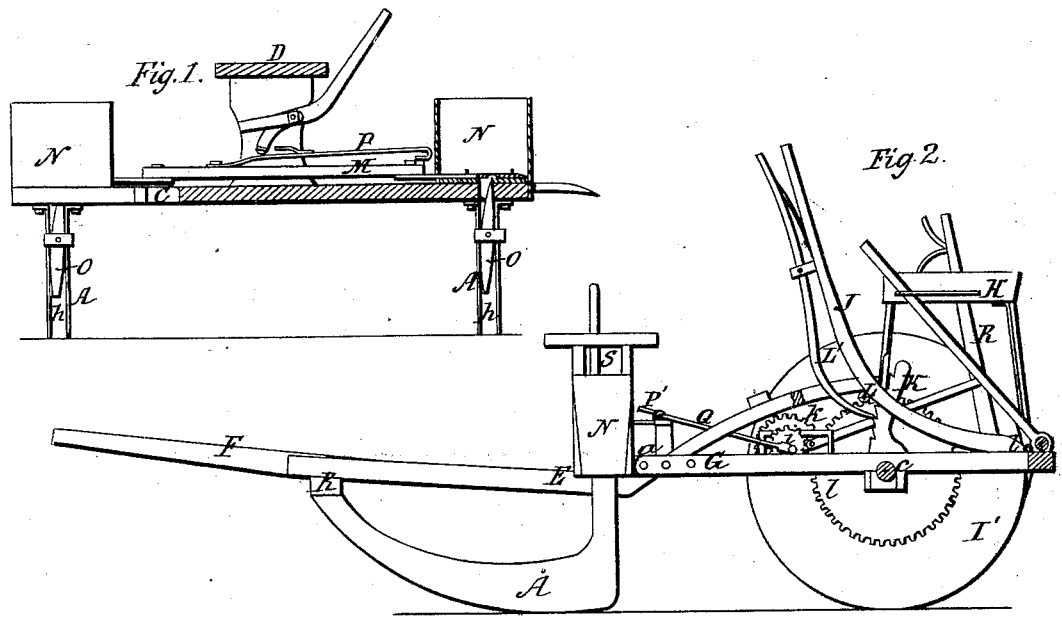
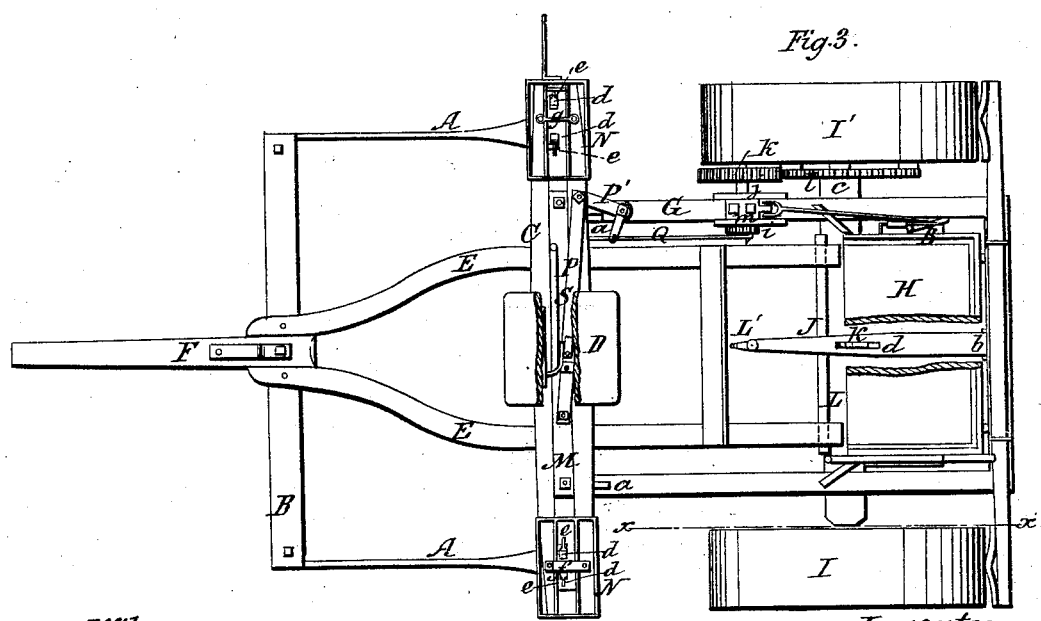
Witnesses:
P. A. Service
Theo. Trusch.
Inventor:
Henry Barsalow
Per Munn & Co.
Attys.

United States Patent Office.

HENRY BARSALOW, OF SAINT ANNE, ILLINOIS.

Letters Patent No. 61,041, dated January 8, 1867.

---

IMPROVEMENT IN SEEDING MACHINE.

---

The Schedule referred to in these Letters Patent and making part of the same.

---

TO ALL WHOM IT MAY CONCERN:

Be it known that I, HENRY BARSALOW, of Saint Anne, in the county of Kankakee, and State of Illinois, have invented a new and improved Seeding Machine; and I do hereby declare that the following is a full, clear, and exact description thereof, which will enable those skilled in the art to make and use the same, reference being had to the accompanying drawings, forming part of this specification, in which—

Figure 1 is a rear view of the front part of the machine detached from the rear part.

Figure 2, a side sectional view of the whole machine, taken in the line x x, fig. 3.

Figure 3, a plan or top view of the same.

Similar letters of reference indicate corresponding parts.

The invention relates to a new and improved seeding machine and it consists in a novel construction and arrangement of parts hereinafter fully shown and described, whereby a very desirable machine, for the purpose specified, is obtained.

The front part of the machine consists of two furrow-openers, A A, curved like sled-runners, and having their front ends connected by a cross-bar, B. The rear ends of the furrow-openers A A are connected to a bar, C, on which a seat, D, is secured centrally. E E are hounds, the front ends of which are attached to the bar B, the rear parts extending considerably beyond the rear of the bar C, and having an upward curve, as shown in fig. 2. Between the front ends of the hounds a draught pole, F, is attached, as shown in figs. 2 and 3. The rear part of the machine is composed of a frame, G, connected to the rear side of the bar C by joints or hinges, $a$. On the rear part of this frame, G, the driver's seat H is placed, and said frame is mounted on two wheels, I I'. To the rear part of the frame G a lever, J, is attached by a hinge or joint, $b$, and a segment rack, K, which is attached to the axle $c$ of the frame G, passes through an oblong slot, $d$, in lever J, the latter having a catch, L', attached to engage with the rack K, and secure the lever J in a more or less elevated position, as desired. This lever, J, has a cross-bar, L, secured to it, on which the rear ends of the hounds E E rest; and it will be seen by raising or lowering the lever J the furrow-openers A A may be made to penetrate the earth at a greater or less distance, as may be desired. M represents a seed-slide, the ends of which work through the lower parts of seed-boxes N N placed on the bar C, one at each end, said slide having two holes or seed cells, $d\ d$, made in it near each end, and provided with slides $e$, for the purpose of varying their capacity, so that a greater or less number of seeds may be deposited in the earth at each dropping, as desired, the holes or cells $d$ discharging their seed as they pass under cut-offs or strikes $f$ in the seed-boxes. In planting cotton seed, the cut-offs or strikes $f$ are dispensed with, and yokes $g$ used instead. The rear parts of the furrow-openers A A are grooved, as shown at $h$, fig. 1, to form seed-conveying passages to the furrows; and in each groove, $h$, there is a valve, O, the upper ends of which are fitted in notches in the under side of the seed-slide M, so as to be operated from the latter. These valves, O, serve to retain the droppings of seed as they are discharged from the seed-boxes, and cause them to be dropped from the lower parts of the grooves $h$ into the furrows. This insures the seed being dropped into the furrows at the proper or desired spots. The seed-slide M has a bar, P, attached to it, the outer end of which is pivoted to one arm of a bent or right-angular lever, P', the other arm being connected to a rod, Q, fitted on a wrist-pin of a gear, $i$, on a shaft, $j$, which has another gear, $k$, upon it; said gear, $k$, meshing into a wheel, $l$, attached to wheel I'. By these means a reciprocating motion is given the seed-slide M automatically; but in cases where it would be desirable to operate said slide by hand, the pinion or gear $k$ is thrown out of gear with the wheel $l$ by shoving the bearing $m$ of shaft $j$ forward by actuating a lever, R, and disconnecting the bar P from the lever P', a hand-lever, S, being connected with bar P. In operating the seed-slide M automatically, in case a quick dropping of the seed is required, the shaft $j$ may be reversed in position so that the gear $i$, which is smaller than $k$, may be made to mesh into wheel $l$ and the rod Q fitted on a wrist-pin on $k$.

I do not claim the seed-slide M nor the valves O in the seed-conveying passages $h$, for they have been previously used; but I do claim as new, and desire to secure by Letters Patent—

1. The curved extension of the hounds E E beyond the rear of the bar C of the front part of the machine, in combination with the lever J, provided with the cross-bar L, for the rear parts of the hounds to rest upon, and the segment rack K and catch L', or their equivalents, all arranged substantially as and for the purpose set forth.

2. The operating of the seed-slide M automatically from the wheel I' by means of the gear $l$, adjustable gears $i\ k$, rod Q, and bent lever P', all arranged substantially as and for the purpose specified.

3. The combination of the hinged or jointed rear part or frame G of the machine, with the extended hounds E E, lever J, with cross-bar L attached, substantially as and for the purpose set forth.

HENRY BARSALOW.

Witnesses:
ACHILLES CHINIQUY,
ALBERT CHINIQUY.